United States Patent
Heafitz et al.

(10) Patent No.: US 11,584,512 B2
(45) Date of Patent: Feb. 21, 2023

(54) WEIGHT DISTRIBUTION SYSTEMS AND CONTROL LOGIC FOR CENTER OF GRAVITY MANAGEMENT OF AIRCRAFTS

(71) Applicant: Aurora Flight Sciences Corporation, a subsidiary of The Boeing Company, Manassas, VA (US)

(72) Inventors: Andrew Mark Heafitz, Cambridge, MA (US); Jason Grzywna, Marlborough, MA (US); Felipe Bohorquez, Cambridge, MA (US); Anna Zolnikov, Cambridge, MA (US); Jose Antonio L. Turalba, Cambridge, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 298 days.

(21) Appl. No.: 16/886,878

(22) Filed: May 29, 2020

(65) Prior Publication Data

US 2021/0371087 A1    Dec. 2, 2021

(51) Int. Cl.
*B64C 17/02*    (2006.01)
*B64C 25/04*    (2006.01)
(Continued)

(52) U.S. Cl.
CPC .............. *B64C 17/02* (2013.01); *B64C 25/04* (2013.01); *B64C 39/024* (2013.01);
(Continued)

(58) Field of Classification Search
CPC ....... B64C 17/02; B64C 25/04; B64C 39/024; B64C 2201/027; G05D 1/0808; G05D 1/101
See application file for complete search history.

(56) References Cited

U.S. PATENT DOCUMENTS 4,949,269 A     8/1990  Buisson et al.
5,582,529 A  * 12/1996  Montgomery .......... B63B 34/10
                                                        441/74
(Continued)

FOREIGN PATENT DOCUMENTS

CN    209560388 U  * 10/2019
KR    101800662 B1 * 11/2017
(Continued)

OTHER PUBLICATIONS

English Translation of KR101800662B1 (Year: 2017).*
(Continued)

*Primary Examiner* — Anshul Sood
*Assistant Examiner* — Matthew Ho
(74) *Attorney, Agent, or Firm* — Quinn IP Law

(57) ABSTRACT

Presented are weight distribution systems for aircraft center of gravity (CG) management, methods for making/operating such systems, and aircraft equipped with CG management systems. A method is presented for managing the CG of an aircraft. The aircraft includes first and second landing gears and an airframe that removably attaches thereto one or more payloads and/or hardware modules. The method includes supporting the aircraft on a support leg that operatively attaches to the airframe and, while supported on the support leg, determining if the aircraft pivots onto the first or second landing gear. If the aircraft pivots onto either landing gear, the method responsively identifies a new airframe position for the payload/hardware module that will shift the aircraft's CG to within a calibrated "acceptable" CG range; doing so should balance the aircraft on the support leg. The payload/hardware module is then relocated to the new airframe position.

20 Claims, 7 Drawing Sheets

(51) Int. Cl.
  *G05D 1/10* (2006.01)
  *G05D 1/08* (2006.01)
  *B64C 39/02* (2023.01)

(52) U.S. Cl.
  CPC ........... *G05D 1/0808* (2013.01); *G05D 1/101* (2013.01); *B64C 2201/027* (2013.01)

(56) References Cited

U.S. PATENT DOCUMENTS

| | | |
|---|---|---|
| 6,533,220 B2 | 3/2003 | Schuster |
| 9,205,922 B1 | 12/2015 | Bouwer |
| 9,963,228 B2 | 5/2018 | McCullough et al. |
| 9,969,494 B1 | 5/2018 | Buchmueller et al. |
| 10,479,503 B2 | 11/2019 | Sikora et al. |
| 10,627,304 B2 | 4/2020 | Golshany et al. |
| 2016/0144954 A1* | 5/2016 | Daigle .................. B64C 39/024 244/17.23 |
| 2019/0321971 A1 | 10/2019 | Bosworth et al. |

FOREIGN PATENT DOCUMENTS

WO  WO-2018007566 A1 *  1/2018  ............. B62B 3/001
WO  WO-2020166054 A1 *  8/2020

OTHER PUBLICATIONS

English Translation of WO-2018007566-A1 (Year: 2018).*
English Translation of WO-2020166054-A1 (Year: 2020).*
English Translation of CN-209560388-U (Year: 2019).*

\* cited by examiner

WEIGHT DISTRIBUTION SYSTEMS AND CONTROL LOGIC FOR CENTER OF GRAVITY MANAGEMENT OF AIRCRAFTS

TECHNICAL FIELD

The present disclosure relates generally to airframe architectures of aircraft. More specifically, aspects of this disclosure relate to systems and methods for distribution of airframe payloads and subsystems to manage the aircraft's center of gravity.

BACKGROUND

Fixed-wing aircraft, such as airplanes and gliders, achieve flight using wings that are immovably attached to the aircraft's airframe and generate aerodynamic lift through a positive angle of attack during forward travel through the air. The wing's airfoil cross-section deflects air downward as the aircraft is propelled forward; this produces a dynamic pressure-gradient on the wing that, in turn, lifts and buoys the airplane during flight. In contrast to conventional fixed-wing aircraft, vertical takeoff and landing (VTOL) aircraft, as the name implies, are capable of vertical takeoffs and landings as well as intermittent hovering flight. The most recognizable example of VTOL aircraft is the helicopter, which is a rotary-wing aircraft (rotorcraft) with engine-driven rotor blades that provide lift and thrust to the aircraft. Tiltwing and tiltrotor aircraft are hybrid-type VTOL that incorporate features of both fixed-wing and rotary-wing vehicles for flight operations.

Many modern-day aircraft—be they fixed-wing, rotary-wing, or hybrids of the two—eliminate the need for an in-vehicle human pilot to operate the aircraft during flight. An unmanned aerial vehicle (UAV), for example, is an aircraft without manual flight controls or a flight deck from which a pilot controls the aircraft. A UAV, or "drone" as it is colloquially known, may operate with various degrees of autonomy, ranging from predominantly manual control to fully autonomous control and therebetween in partially automated flight control architectures. Remote-piloted UAVs are part of an unmanned aircraft system (UAS) that employs a resident computer control system that is wirelessly connected to a land-based ground control station for piloting the aircraft. Handheld UAVs are radio-controlled (RC) aircraft that are smaller than a bookcase and manually operated by a handheld controller. Commercial-class UAVs, in contrast, have built-in control and guidance systems to provision speed control, flight stabilization, and navigation functions.

Conventional aircraft and modern-day UAVs are frequently employed to transport a variety of different payloads to assorted destinations. However, attaching a payload of distinct shape, size, or weight to an aircraft's airframe will oftentimes shift the vehicle's center of gravity (CG) and concomitantly introduce unwanted bending moments to the aircraft. For fixed-wing configurations, changing the location of the CG directly affects the aircraft's performance and stability: fore or aft movement of the CG will change the amount of tail down force and lift needed for flight stabilization. A balanced CG may be even more critical for rotary-wing aircraft; when a helicopter is fully loaded, for example, CG deviations of a few inches can dramatically change the vehicle's stability and handling characteristics. For rotorcraft with multiple rotor propulsion assemblies, an unwanted shift in CG changes the distribution of vehicle weight and, thus, the burden on the individual rotors. In addition, the payload tends to cause bending moments in the airframe support arms bolstering the motor/propeller assemblies.

SUMMARY

Presented herein are weight distribution systems with attendant control logic for aircraft CG management, methods for making and methods for operating such systems, and aircraft equipped with CG management systems. By way of example, there are presented systems and methods for detecting a misbalancing of payloads on an aircraft, and responsively ameliorating this misbalancing through redistribution of payloads across the airframe of the aircraft. A preflight CG check of a UAV is conducted by balancing the vehicle on a single mark or between two marks to ensure that the CG falls within a calibrated "acceptable" CG range. This preflight measurement, which may be conducted either manually or robotically, may be expected to remain constant assuming the payload and hardware layout across the airframe remains unchanged. For an operational UAV, such as a package delivery (cargo) drone, the aircraft's payload or hardware may change during or after flight; a CG check is therefore repeated post-flight. If the aircraft's CG is not within acceptable limits, a payload and/or a repositionable hardware module (e.g., battery, antenna, etc.) may be manually relocated, e.g., via a modular rail system attached to the airframe, or automatically relocated, e.g., via an on-body liner transducer or servomotor, to offset any deviation from the calibrated CG range.

Aspects of this disclosure are directed to methods for managing the CG of an aircraft. The aircraft includes a first (front or starboard) landing gear, a second (rear or port) landing gear, and a load-bearing airframe that removably attaches thereto one or more payloads (e.g., cargo, aftermarket device, etc.) and/or one or more hardware modules (e.g., flight electronics module, digital camera module, battery pack module, sensor array module, etc.). A representative method includes, in any order and in any combination with any of the above and below disclosed options and features: supporting the aircraft on a support leg that operatively attaches to the airframe; determining if the aircraft, while supported on the support leg, pivots onto any one of the landing gears; responsive to the aircraft pivoting onto one of the landing gears, identifying a new airframe position for a payload and/or hardware module, the new airframe position being determined to shift the aircraft's CG to within a calibrated CG range and thereby balance the aircraft on the support leg; and thereafter relocating the payload/hardware module to the new airframe position.

Additional aspects of this disclosure are directed to aircraft equipped with CG management systems. As used herein, the terms "aircraft" and "vehicle" may be used interchangeably and synonymously to include any relevant vehicle platform, such as fixed-wing aircraft, rotary-wing aircraft, VTOL aircraft, airships, and UAVs, including manned, unmanned, and fully or partially autonomous variations thereof. In an example, an aircraft includes a load-bearing airframe with landing gear, propulsion and guidance systems, and other standard original equipment. The airframe removably attaches thereto one or more payloads and/or hardware modules. The aircraft's landing gears, which may be fixed, retractable, detachable, wheeled, skid, ski, etc., project downward from the airframe and cooperatively buttress the aircraft during takeoff and landing operations.

Continuing with the discussion of the foregoing example, the aircraft includes a controller or network of controllers, which may be resident to and/or remote from the airframe. The controller/controller network is programmed to execute memory-stored control logic to perform one or more operations, including determining if the aircraft, while supported on the support leg, pivots onto one or more of the aircraft's landing gears. If so, the controller/controller network responsively identifies a new airframe position for a payload/hardware module that will shift the aircraft's CG to within a calibrated CG range; doing so should balance the aircraft on the support leg. A command prompt is output to relocate the payload/hardware module to the new airframe position. These command prompts may take on the form of electronic messages sent to an operator and/or control signals transmitted to an onboard actuator or an off-board robot unit.

Further aspects of this disclosure are directed to weight distribution control system for managing an aircraft's CG. By way of non-limiting example, a weight distribution control system includes one or more support legs that is/are configured to operatively attach to the airframe of an aircraft, interposed between the aircraft's landing gears. The aircraft is supported on the support leg/legs and, when the weight on the airframe is properly distributed, the aircraft balances on the support leg/legs. A first sensor device is configured to detect loading of the aircraft onto a first landing gear, and a second sensor device is configured to detect loading of the aircraft onto a second landing gear. The weight distribution control system also includes one or more controllers that is/are programmed to: determine, based on a sensor signal received from the first or second sensor device, if the aircraft has pivoted onto the first or second landing gear, respectively, while supported on the support leg; responsive to the aircraft pivoting onto the first or second landing gear, identify a new airframe position for a payload and/or hardware module, the new airframe position being determined to shift the CG of the aircraft to within a calibrated CG range and thereby balance the aircraft on the support leg; and, output a command prompt to relocate the payload and/or hardware module to the new position.

For any of the disclosed systems, methods, and aircraft, the support leg may take on the form of a central landing gear that is movably mounted at a proximal end thereof to the airframe, located between the aircraft's landing gears. In this instance, the support leg may be retractable for selective movement into and out of contact with a support structure (e.g., ground, platform, wall, ceiling, crane, etc.). The support structure may be located underneath the aircraft; if so, a landing skid may be mounted to a distal end of the support leg opposite the proximal end mounted to the airframe. This landing skid buttresses the aircraft on the support structure. In this instance, the aircraft's calibrated CG range may have a fore-aft range length and/or a starboard-port range width relative to the aircraft's airframe. Optionally, the landing skid may have a fore-aft skid length and/or a starboard-port skid width, each of which may be substantially coextensive with its counterpart length/width of the calibrated CG range.

For any of the disclosed systems, methods, and aircraft, the first landing gear has a first height, the second landing gear has a second height, and the support leg has a third height that may be greater than the heights of the aircraft's landing gears. In this instance, each of the landing gears may include a respective load sensor that is operable to sense when that landing gear is loaded. Determining if the aircraft has pivoted onto a landing gear may include receiving, via a controller from one or more of the load sensors, one or more sensor signals indicative of contact of a single or multiple landing gears with the subjacent support structure.

For any of the disclosed systems, methods, and aircraft, the support leg may take on the form of a loading stanchion that projects upward from a support structure subjacent the aircraft. In this instance, supporting the aircraft on the support leg includes balancing the aircraft on the loading stanchion. The support structure may optionally include a discrete sensor pad adjacent each of the aircraft's landing gears. Determining if the aircraft pivots onto a landing gear may optionally include receiving, via a controller from a sensor pad, a sensor signal indicating contact of that sensor pad with its corresponding landing gear.

For any of the disclosed systems, methods, and aircraft, locating and attaching the payloads/hardware modules to the airframe may be manual or automated. As an example, the aircraft may include a resident electronic actuator that is mounted to the airframe and operable to reposition the payload/hardware module. To relocate a payload/hardware module to a new position, a resident or remote controller transmits one or more command signals to the electronic actuator to reposition the payload/hardware module relative to the airframe. Optional configurations may employ a system-automated robot cell with an end effector for moving or mounting a payloads or hardware module. Alternatively, an electronic command prompt with instructions for relocating and/or mounting a payload/module to the airframe may be transmitted to an operator.

For any of the disclosed systems, methods, and aircraft, a payload or hardware module may be attached to the aircraft by rigidly mounting the payload/hardware module to the airframe. As an example, the aircraft may include one or more mounting rails affixed to any suitable exterior surface of the airframe. The rail(s) removably mount thereto a carriage that supports a payload or hardware module. Each mounting rail may include an L-shaped slot that slidably receives therein a complementary slide pin, which is projecting transversely from the carriage. Each mounting rail may also include a fastener through-hole configured to receive therethrough a complementary locking pin, which fastens the carriage to the rail. Payloads and hardware modules may be attached to the aircraft in other suitable manners, including as stowage inside an airframe storage compartment or suspended via cabling or control arm from underneath the airframe.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
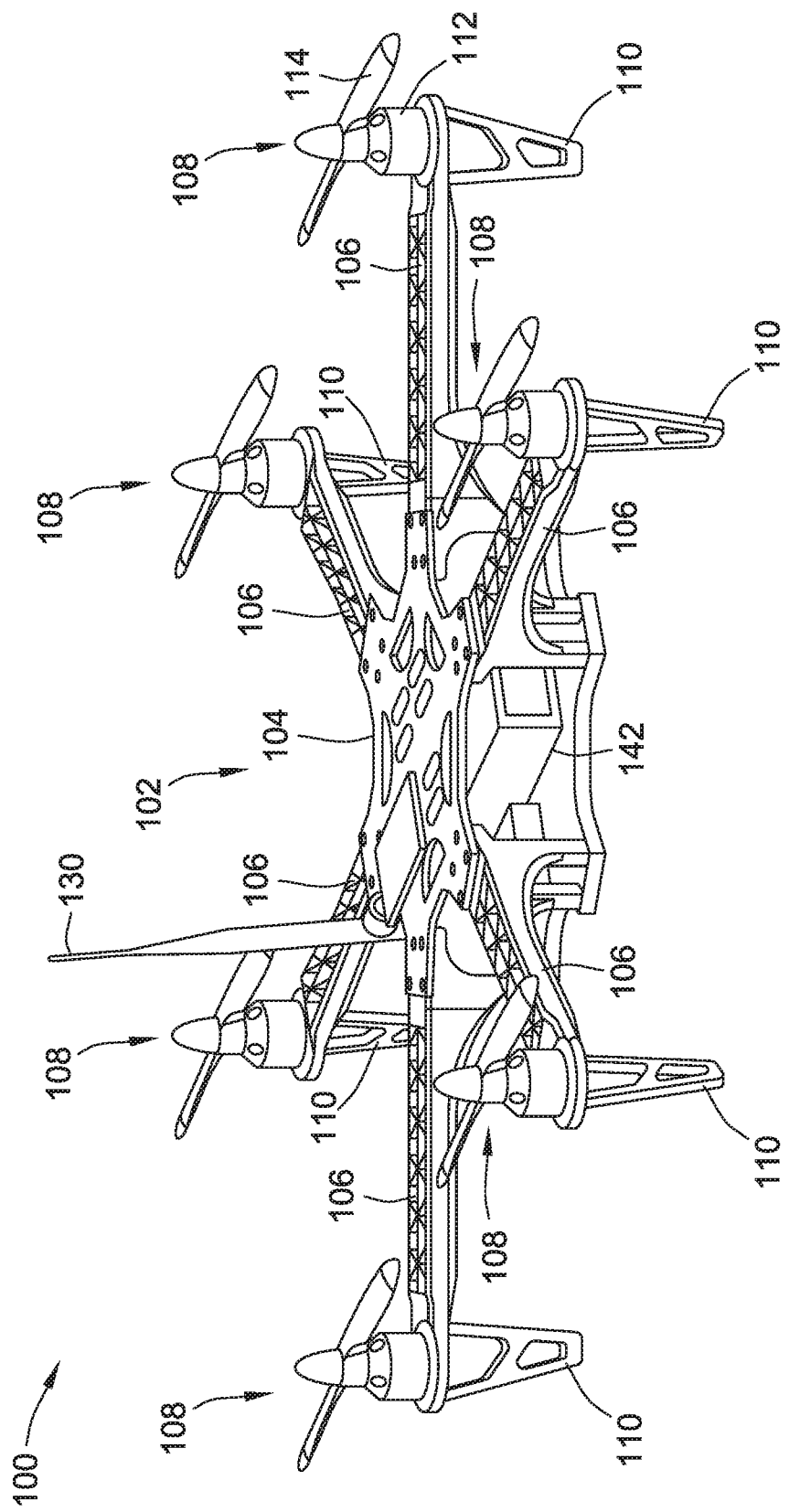
FIG. 1 is an elevated, perspective-view illustration of a representative aircraft in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Technical Field, Background, Summary, and Detailed Description sections, but not explicitly set forth in the claims, should not be incorporated into the claims, singly or collectively, by implication, inference or otherwise. Moreover, the drawings discussed herein are not necessarily to scale and are provided purely for instructional purposes. Thus, the specific and relative dimensions shown in the drawings are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, front, back, left, right, etc., may be with respect to an aircraft that is operatively oriented in an upright position on a horizontal support surface.

Illustrated in the drawings and discussed below are weight distribution systems for managing an aircraft's center of gravity (CG). By way of example, a method is presented for supporting a UAV on a single or multiple landing gear such that, if a package is loaded onto the airframe in a manner that shifts the CG to outside acceptable limits, the UAV tips a measurable distance to sense that the new CG is out of range. A central landing gear of an aircraft is aligned with the CG (e.g., with a calibrated acceptable CG range) and, optionally, may be equipped with nose and/or tail wheels. In addition, or alternatively, the central landing gear may include a landing skid that is coextensive with the front and rear of the aircraft's calibrated "acceptable" CG range. If the CG of the loaded aircraft is located within the acceptable range, the aircraft will balance on this central landing gear. If the CG is out of range, the aircraft will tip forwards or backwards or pivot to starboard or port.

For at least some system architectures, the skid of the central landing gear may extend transversely across the aircraft to measure longitudinal displacement of the CG. In addition, or alternatively, the skid of the central landing gear may extend longitudinally across the aircraft to measure lateral displacement of the CG. Secondary landing gears catch the aircraft after a small displaced angle, e.g., to prevent vehicle damage. Through visual inspection, an operator would see that the aircraft has tipped and may not be suitable for flight. Alternately, a sensor or sensor array is operable to detect that a front or rear or lateral landing gear has touched the ground and output a sensor signal reporting the misaligned CG to the aircraft systems. An operator or an automatic load shifting device can move the payload, battery module, or other ballast to adjust the airframe load distribution until the aircraft pivots back to and balances on the center landing gear. The allotted range for aircraft rotation may be constrained to restrict the fore-aft/starboard-port movement of the CG with the angular movement of the aircraft; this may help to ensure that the required amount of payload adjustment is precise. Rather than employing the central landing gear of the aircraft, balancing post(s) and sensing functions may be incorporated into a landing pad, e.g., to help reduce the gross vehicle weight (GVW) of the aircraft.

Conventional UAVs are able to attach vehicle subsystems, hardware modules, and/or payloads to the inside or outside of the airframe. Presently, there is no universal standard specific to UASs for attaching articles to the UAV's airframe. When quick release or adjustability is needed, one available approach is to use a Picatinny (pic) rail or dedicated mounting bracket; however, these features tend to be heavy, have limited flexibility, have a relatively large footprint, and tend to loosen over time. Presented herein are modular rail systems with a single mounting rail or multiple mounting rails located at discretized lateral/longitudinal rail positions for mounting payloads, hardware, etc. Mating rails of a pair, which may be parallel, perpendicular, or oriented at an oblique angle, are not constrained by a minimum or maximum separation distance. The modular rail system allows for mounting narrow payloads and payloads that apply a large moment. If a payload is wide or loaded laterally, the modular rail system distributes the load over a large area of the mounting surface, resulting in high stiffness of the assembly.

Disclosed modular rail configurations may attach a payload/module to a mounting rail using a support carriage with a complementary flange that sandwiches between opposing walls of the rail. The support carriage may be fabricated with a shoulder screw projecting from one side of the carriage flange, and a pin through-hole extending through one end of the carriage flange. Each mounting rail is fashioned with a carriage interface with slots that allow shoulder screws to slide and lock in place, and pin holes that align with the pin through-holes to receive a locking pin or similarly suitable fastener. The carriage may be machined or molded from a rigid plastic and may be customized to attach to a plate, tube, or any other shape. As yet a further option, a standalone mount with a pin may be used to mount a single item, such as a Global Positioning System (GPS) antenna. Two carriages may be aligned in tandem to mount elongated articles, such as a scope, on a single mounting rail. Multiple carriages may be used to mount larger payloads, like battery modules or sensor arrays. The mounting rails may be located on the top, bottom, sides, and/or interior of the airframe. As yet a further option, articles may be affixed directly to a mounting rail, eliminating the need for a support carriage.

Referring now to the drawings, wherein like reference numbers refer to like features throughout the several views, there is shown in FIG. 1 a representative aircraft, which is designated generally at 100 and portrayed herein for purposes of discussion as a multi-rotor vertical takeoff and landing unmanned aerial vehicle. The illustrated aircraft 100—also referred to herein as "vehicle" or "UAV" for brevity—is merely an exemplary application with which aspects and features of this disclosure may be practiced. In the same vein, incorporation of the present concepts into a human controlled unmanned vehicle should also be appreciated as an exemplary implementation of the concepts disclosed herein. As such, it will be understood that aspects of the present disclosure may be incorporated into manned and unmanned aerial vehicles, which may be fully or partially autonomous, and may be implemented for any logically relevant type of aircraft architecture (e.g., fixed-wing, rotary-wing, hybrid VTOL, etc.). Lastly, only select components have been shown and will be described in additional detail herein. Nevertheless, the systems, methods and aircraft discussed below may include numerous additional and alternative features, and other available peripheral components, for carrying out the various functions of this disclosure.

UAV 100 of FIG. 1 is shown as a cargo drone with a load-bearing airframe 102 that is generally composed of a central fuselage 104 and a circular array of (six) rotor booms 106. The horizontally oriented rotor booms 106 are circumferentially spaced around and extend in a radially outward direction from the fuselage 104. Projecting orthogonally from a terminal end of each boom 106 is a fixed skid-type landing gear 110. These landing gears 110 collectively buttress the UAV 100 when the vehicle is not in flight as well as prior to takeoff and after landing operations. Also cantilevered to the fuselage 104 at the terminal ends of the booms 106 are motor-driven rotor assemblies 108. The fuselage 104, rotor booms 106, and landing gears 110 may be integrally formed as a single-piece, unitary structure, or manufactured as separate components that are securely coupled to one another. While a six-rotor (hexarotor) cargo drone is illustrated throughout the figures, the UAV 100 may take on alternative drone and aircraft configurations, different size classifications, and/or may employ greater or fewer than six rotors, and may employ various control surfaces and lifting surfaces. In the same vein, the landing gears 110 may be greater or fewer than six and, optionally, may take on alternative locations and configurations from that shown in the Figures.

Figure 2:
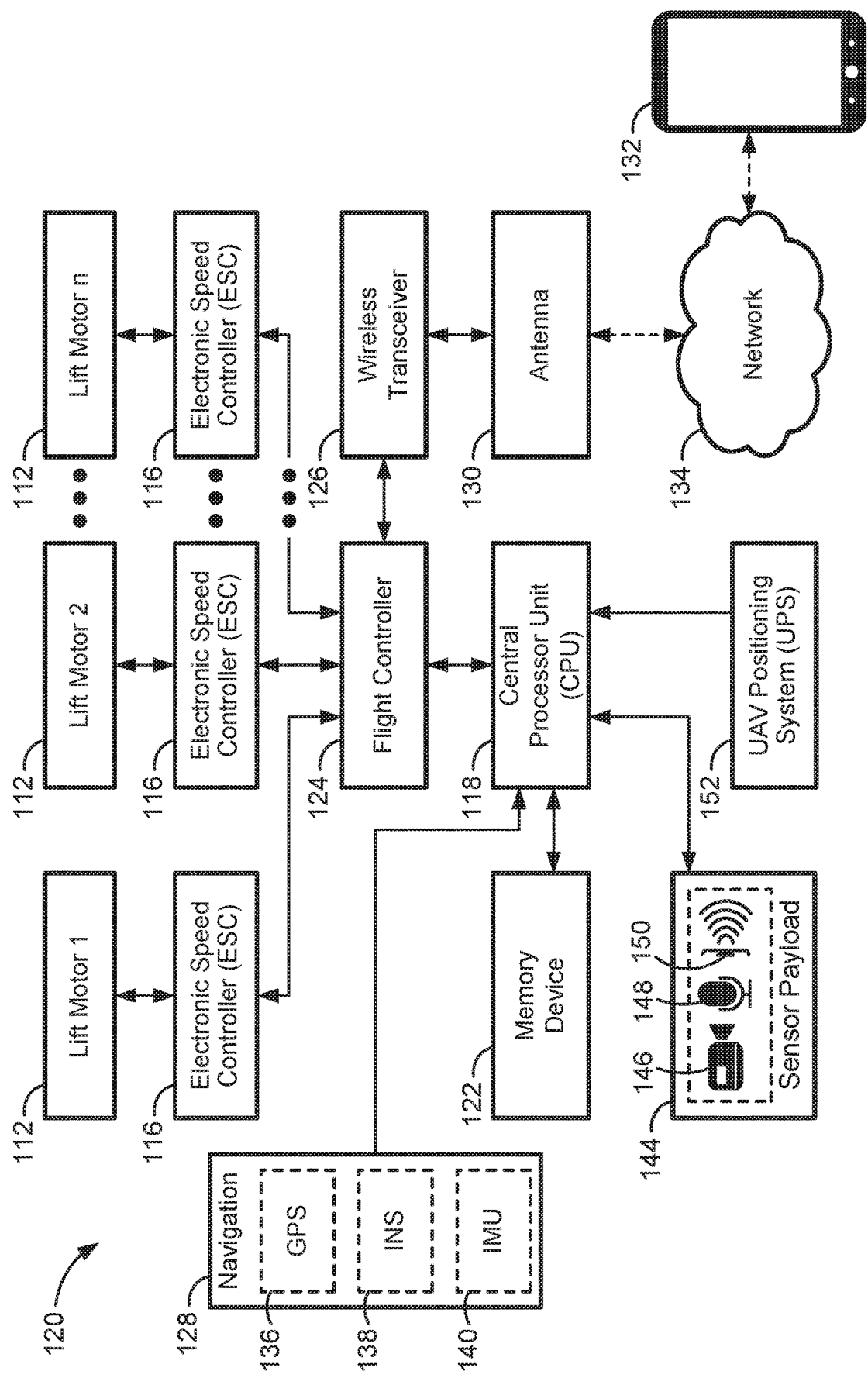
FIG. 2 is a schematic diagram illustrating the aircraft control system architecture of the representative aircraft of FIG. 1.

Rotor assemblies 108 of FIG. 1 may be operated individually, jointly, and in assorted combinations to provide lift and thrust to the UAV 100. Each rotor assembly 108 may be typified by a lift motor 112 that drives a dual-blade propeller assembly 114 mounted at a distal end of a mast shaft (not visible). These hingeless "simple" rotor assemblies 108 are each juxtaposed with a landing gear 110 at the distal end of a rotor boom 106 and vertically oriented to direct thrust forces downward relative to the airframe 102. The lift motors 112 may be embodied as brushless permanent magnet (PM) electric motors controlled via an electronic speed controller (ESC) 116 (FIG. 2). While shown packaged at the distal end of each boom 106, the six lift motors 112 (or a single, shared lift motor) may instead be located on the fuselage 104 of the airframe 102. As a further option, torque generated via a lift motor 112 may be transmitted to one or more propeller assemblies 114 via a gearbox or power-shifted transmission interposed between the motor 112 and propeller(s) 114.

FIG. 2 is a schematic diagram illustrating the architecture of an aircraft control system 120 for governing the vehicle components and associated operations of the UAV 100 of FIG. 1. As illustrated, the UAV 100 includes an aircraft central processing unit (CPU) 118 that is communicatively connected (wired or wirelessly) with a resident memory device 122, a flight controller 124, a wireless communications transceiver 126, and a navigation system 128. Control processor, control module, module, controller, processor unit, processor, and permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), shown schematically at 122 in FIG. 2, whether resident, remote, or a combination of both, store processor-executable software, firmware programs, routines, etc.

Software, firmware, programs, instructions, routines, code, algorithms, and similar terms may be used interchangeably and synonymously to mean any processor-executable instruction sets, including calibrations and look-up tables. The aircraft CPU 118 may be designed with a set of control routines and logic executed to provide desired functionality. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 120.

With continuing reference to FIG. 2, the wireless communications transceiver 126 is operatively coupled with an antenna 130 to exchange data between the UAV's CPU 118 and a human-machine interface (HMI) device 132, such as a handheld smartphone, tablet computer, laptop computer, remote controller, or other control unit (e.g., a base station). As shown, the UAV 100 communicates data with the HMI device 132 over a wireless communications network 134. Network 134 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). In at least some aspects, most if not all data transaction functions carried out by the system 120 may be conducted over a wireless network, such as a wireless local area network (WLAN) or cellular data network, to ensure freedom of movement of the UAV 100 and HMI device 132. The HMI device 132 may facilitate monitoring and control of the UAV 100 and its payload(s).

Aircraft CPU 118 communicates with the ESC 116 via flight controller 124 to regulate operation of the rotor assemblies 108 in response to command signals from an operator, an autopilot system, a navigation system 128, or other remote system via the wireless transceiver 126. For at least some system architectures, the aircraft's CPU 118, memory device 122, flight controller 124, etc., may be discrete devices or may be integrated into a single component or circuit. In operation, the flight controller 124 dynamically—in real-time or near real-time—adjusts the thrust output from each of the rotor assemblies 108 on each rotor boom 106 during the various stages of flight (e.g., takeoff, cruising, landing) via the ESC 116 to control three-dimensional (3D) motion, including vehicle propulsion, lift, roll, pitch, yaw, etc., of the UAV 100. In this regard, the flight controller 124 may be operable to independently and jointly control the individual lift motors 112 and thereby generate a desired lift thrust for each of the rotor assemblies 108. Propeller assembly 114 speed and, thus, rotor assembly 108 output may be controlled by modulating power supplied to each lift motor 112 from a resident rechargeable energy storage system (RESS), represented in FIG. 1 as a lithium-ion (Li-ion) or silicon-based Li-ion battery module 142 mounted inside the central fuselage 104.

UAV 100 may be equipped with optional resident (onboard) and/or remote (offboard) hardware to provision fully autonomous or partially automated flight operations. By way of example, the aircraft CPU 118 may communicate with a resident navigation system 128, which is generally composed of a Global Positioning System (GPS) module 136, an Inertial Navigation System (INS) module 138, and an Inertial Measurement Unit (IMU) module 140. IMU module 140 may include one or more gyros, accelerometers, magnetometers, etc., to determine vehicle orientation, angular rate, and g-force. The satellite-based GPS module 136 retrieves real-time geodetic data for the UAV 100, including absolute drift-free position values that may be used to reset an INS solution or may be fused with it by a Kalman Filter or other suitable mathematical technique. The navigation system 128 communicates inertial stabilization, GPS, and navigation data to the aircraft CPU 118, which may be used to facilitate automated and manual operation of the aircraft 100.

As indicated above, the UAV 100 may be scaled and customized for any of a variety of drone classifications. As shown, the UAV 100 of FIGS. 1 and 2 is adapted as a reconnaissance and logistics drone equipped with a sensor package payload 144 that helps to enable autonomous aircraft navigation, guidance and control. For instance, the sensor package payload 144 is generally composed of a high-resolution digital camera 146, an audio input/output (I/O) device 148, and a sensor array 150. Digital camera 146 of FIG. 2 is an optical instrument for capturing and recording images and/or video. By comparison, the audio I/O device 148 is a sound transducer for transmitting and receiving audible data, and may comprise one or more microphones, echolocation sensors, ultrasonic sensing devices, voice recognition hardware/software, etc. Lastly, the sensor array 150 facilitates autonomous functionality and provides sensor data, and may include radar sensing, Doppler sensing, light detection and ranging (LIDAR) sensing, etc. Sensor package payload 144 is securely mounted to the airframe 102 and communicates with the aircraft CPU 118, e.g., to assist with UAV navigation, speed, etc. In addition, the sensor package payload 144 may be rotatably and pivotally coupled to, for example, an underside surface of the airframe 102 via a payload-stabilizing gimbal system to enable the sensor package payload 144 to be more easily oriented to monitor objects below and/or on the ground.

As another example of optional vehicle hardware, the aircraft CPU 118 may be operatively coupled with a UAV Positioning System (UPS) module 152 operable for real-time vehicle location, e.g., in scenarios in which GPS is unavailable or failed. The UPS module 152 measures UAV 100 position within an environment based on sensor readings and/or memory-stored navigational maps, which may be retrieved by or loaded and stored to the UAV 100 (e.g., in cache memory of memory device 122). The UPS module 152 may include, or be communicatively coupled with, various sensors, such as motion capture sensors, radio-beacons, infrared sensors, acoustic sensors, etc. In certain aspects, the UPS module 152 may employ ISR data from the sensor package payload 144 to determine the UAV 100 position within a given operating environment.

Figure 3:
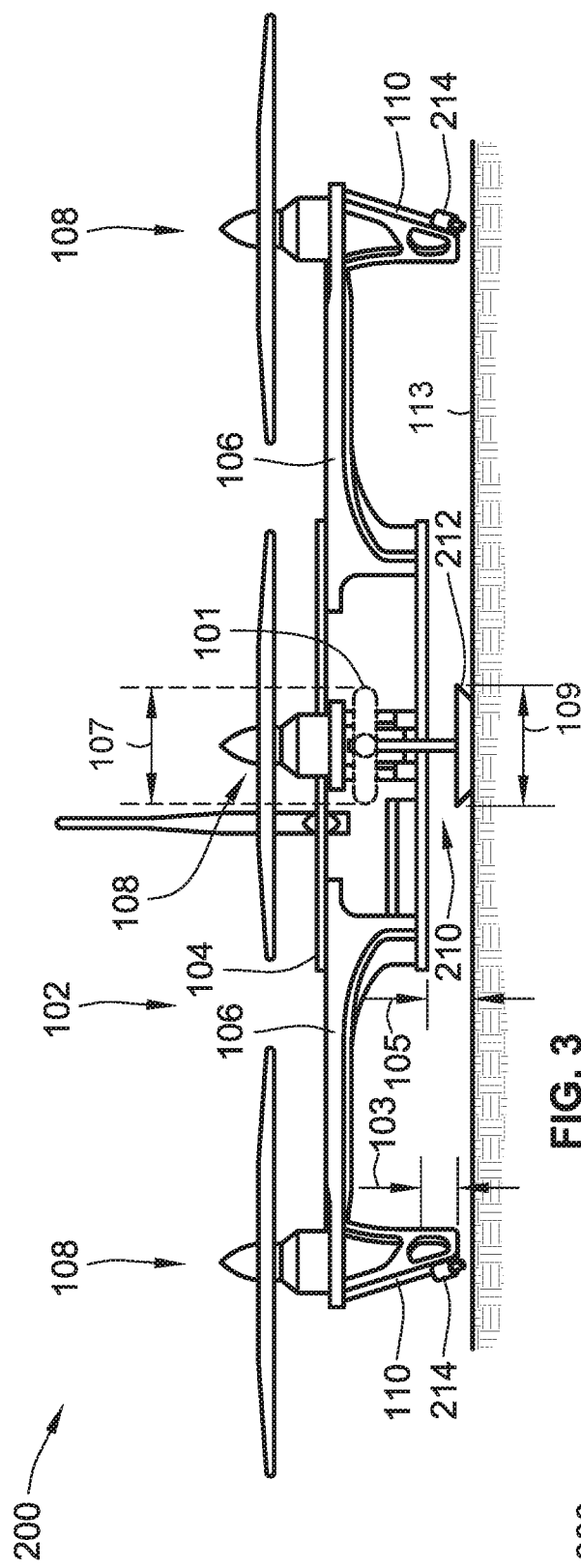
FIG. 3 is a side-view illustration of a representative multi-rotor vertical takeoff and landing unmanned aerial vehicle equipped with a representative weight distribution system for aircraft CG management in accord with aspects of the disclosed concepts.
Figure 4:
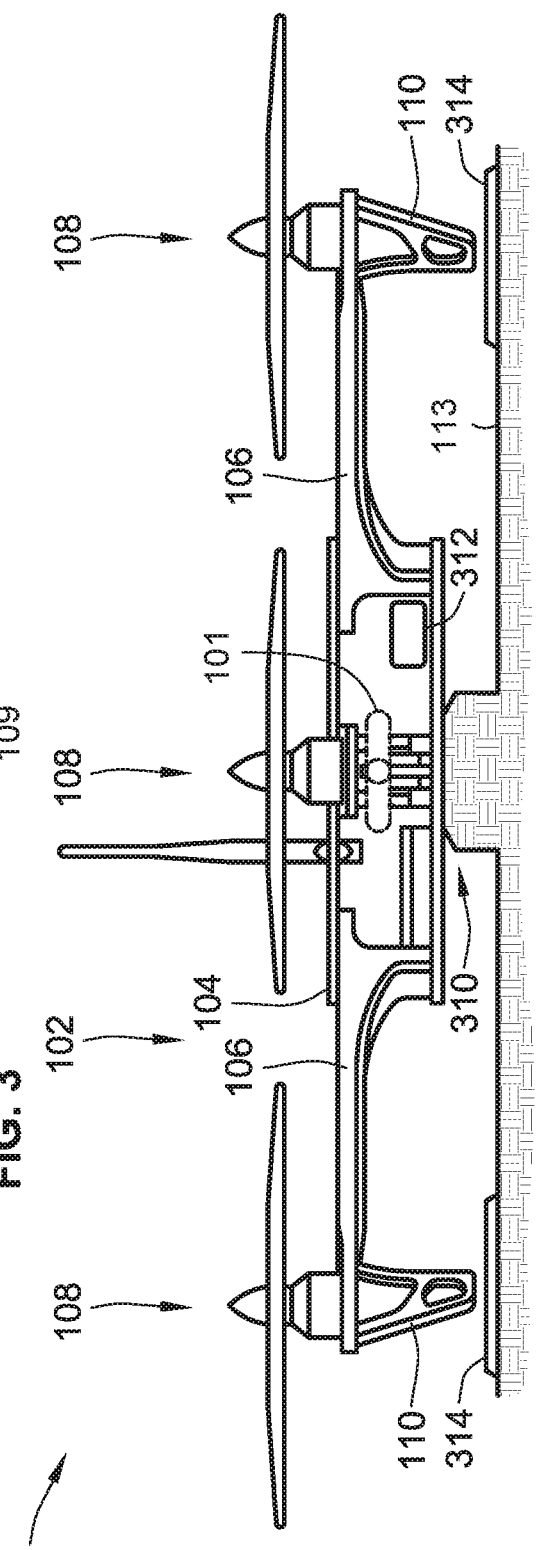
FIG. 4 is a side-view illustration of another representative multi-rotor VTOL UAV interfacing with another representative weight distribution system for aircraft CG management in accord with aspects of the disclosed concepts.
Figure 5A:
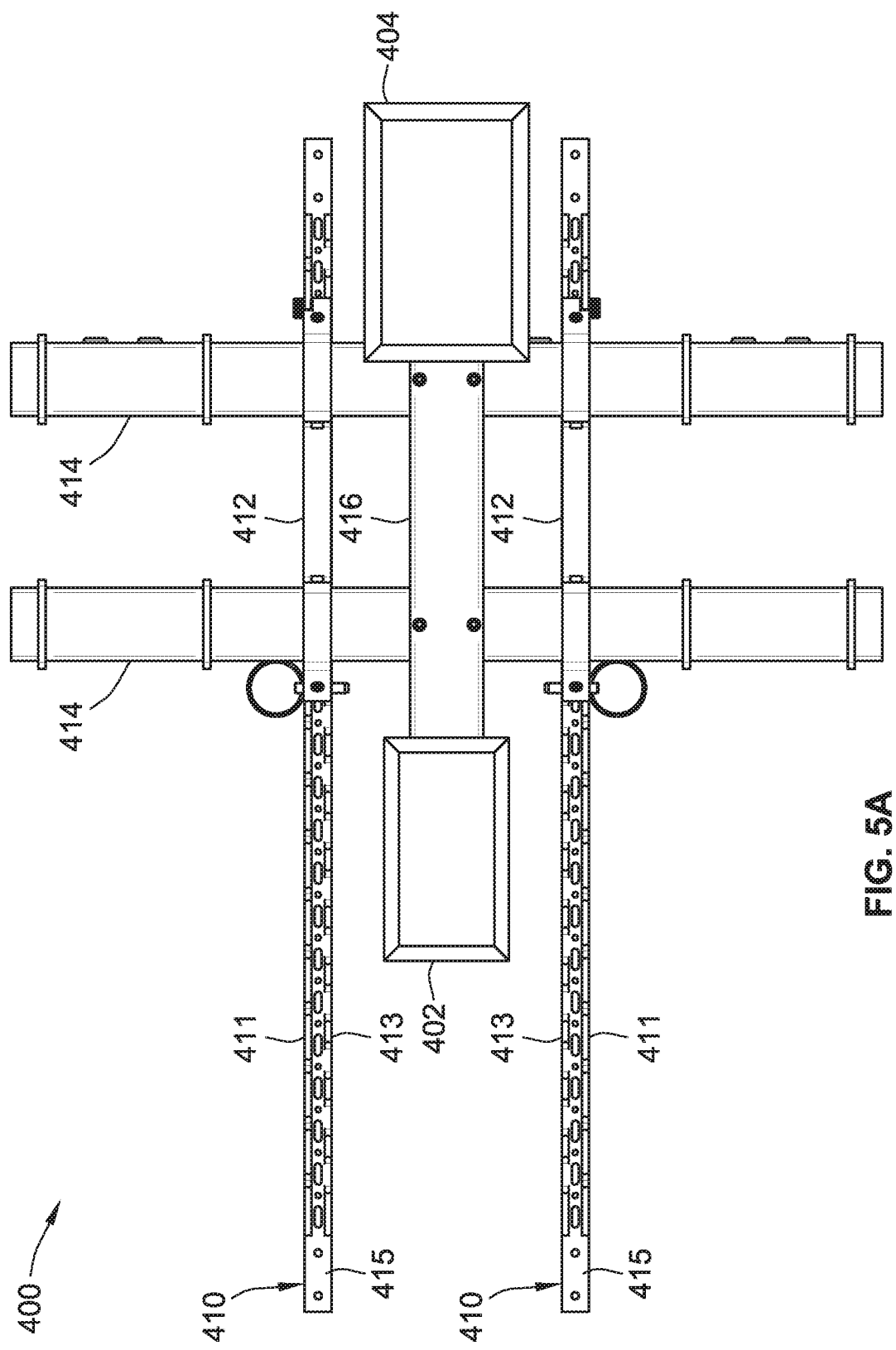
FIGS. 5A and 5B are plan-view and side-view illustrations, respectively, of a representative modular rail-and-carriage system for weight distribution of an aircraft in accordance with aspects of the present disclosure.
Figure 5B:
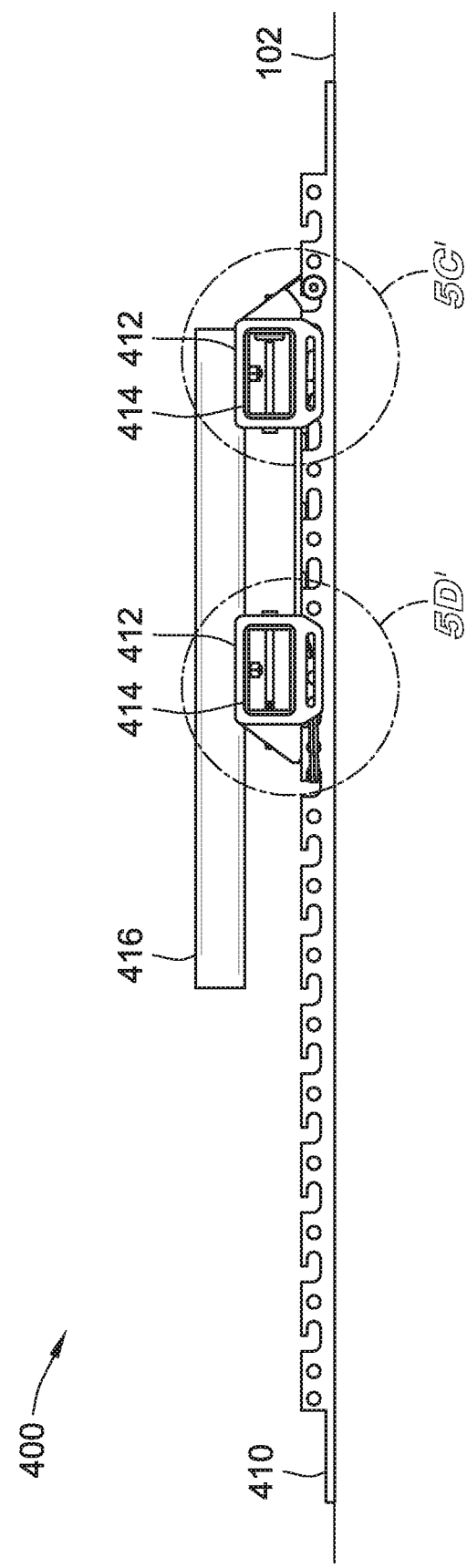
Figure 5C:
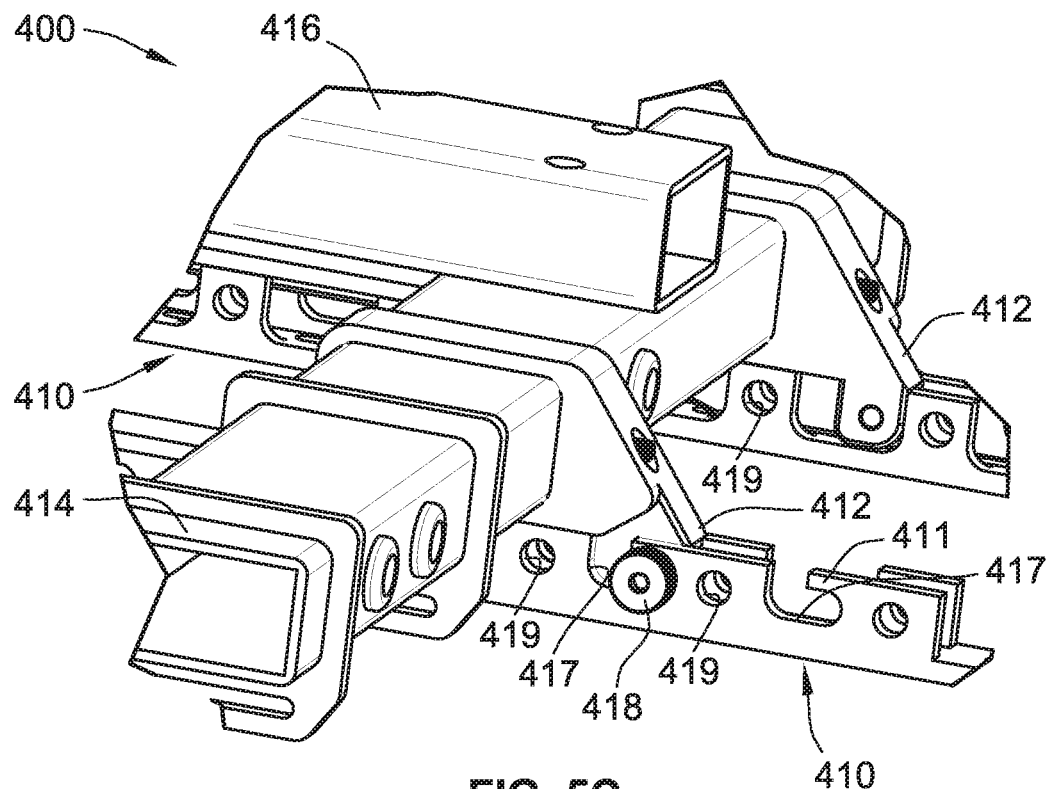
FIGS. 5C and 5D are enlarged, perspective view illustrations of the representative modular rail-and-carriage system of FIG. 5A taken at locations 5C' and 5D', respectively, in FIG. 5B.
Figure 5D:
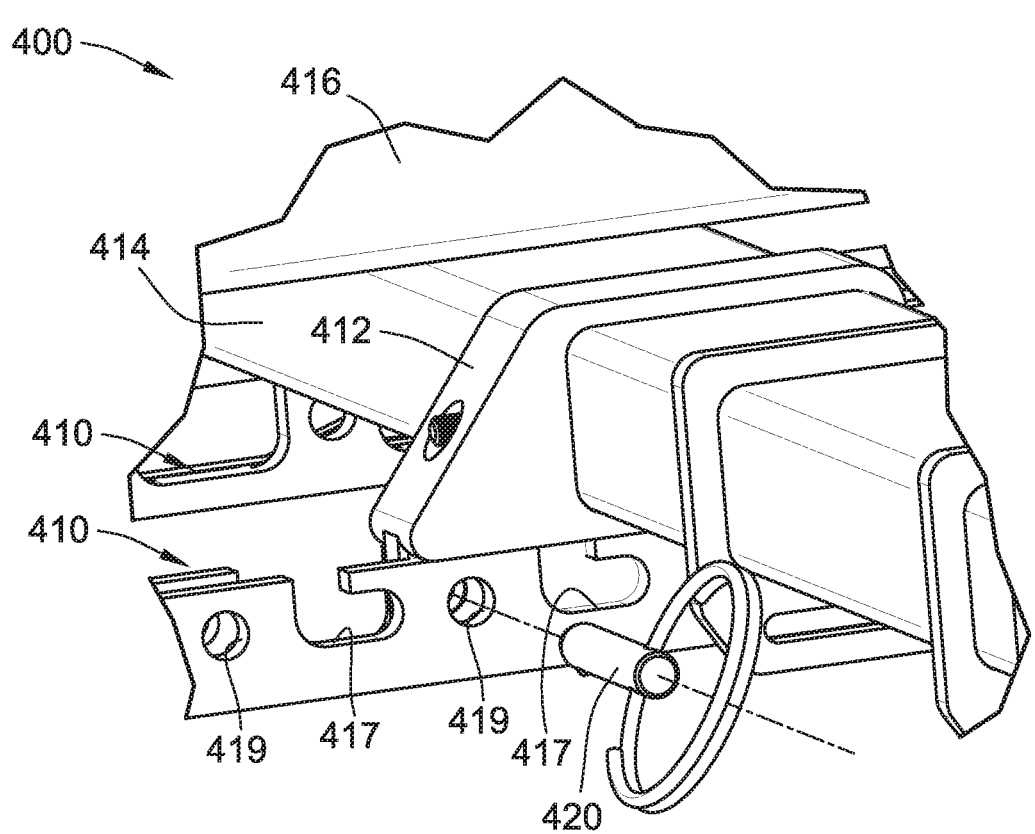

Turning next to FIGS. 3 and 4, there are shown different examples of multi-rotor VTOL UAVs—designated generally at 200 (FIG. 3) and 300 (FIG. 4)—with an weight distribution system for managing the aircraft's CG. While differing in appearance, it is envisioned that the features and options disclosed herein with reference to the UAV 100 of FIGS. 1 and 2 may be incorporated, singly or in any combination, into the UAVs 200 and 300 of FIGS. 3 and 4, and vice versa. As a point of similarity, both of the UAVs 200 and 300 include an airframe 102 with a central fuselage 104 and a plurality of rotor booms 106 projecting horizontally from the central fuselage 104. In addition, multiple landing gears 110 project downward from terminal ends of the rotor booms 106, and multiple rotor assemblies 108 project upward from the terminal ends of the booms 106. Aircraft control system 120 of FIG. 2 may be incorporated, in whole or in part, into the UAVs 200 and 300 of FIGS. 3 and 4. As a point of demarcation from UAV 100 of FIG. 1, the UAVs 200 and 300 employ four (4), rather than six (6), landing gears 110 that are arranged in a square array.

Prior to vehicle takeoff (preflight) or after vehicle landing (postflight), vehicle payload and hardware distribution may be inspected to ascertain whether or not the UAVs 200 and 300 are misbalanced. Upon determining that a vehicle is in fact out of balance, ameliorative action may be taken to ensure satisfactory aircraft balance, e.g., for optimized flight operations, stability, and dynamics. In both examples, the aircraft 200, 300 is balanced on a support leg 210 and 310, respectively, that is operatively attached to the UAV's airframe 102. In FIG. 3, the support leg 210 takes on the form of a central landing gear that is securely mounted at a proximal (top or first) end thereof to the airframe 102, located at the geometric center of the aircraft's four landing gears 110. The support leg 210 may be a fixed, detachable, or (as shown) retractable landing gear that is designed to stably support thereon the UAV 200 when the vehicle payload/hardware is properly distributed with respect to a vehicle-calibrated "acceptable" CG range 101. Even though a single support leg 210 is shown located at the center of the airframe 102, it is envisioned that the UAV 200 may employ multiple support legs 210 that are arranged in any of a multitude of predetermined patterns on the airframe 102 to accommodate different aircraft architectures.

To conduct a preflight/postflight CG check, the support leg 210 of FIG. 3 is manually positioned (e.g., via a vehicle operator) or automatically deployed (e.g., via a resident actuator) into contact with a support structure, such as a launch pad 113 that is located underneath the aircraft 200. Alternative system layouts may launch the UAV 200 from an overhead truss, a wall-mounted girder, or a crane hoist, etc.; in such cases, support leg 210 may be altered, for example, to project upwardly or transversely from the airframe 102 for operative engagement with the support structure. For applications using a launch pad support structure, a landing skid 212 may be securely mounted to a distal (bottom or second) end of the support leg 210; this landing skid buttresses the UAV 200 on the launch pad 113. As shown, the calibrated CG range 101 has a fore-aft range length 107 relative to the airframe 102 of the UAV 200, and the landing skid 212 has a fore-aft skid length 109 that is substantially coextensive with the fore-aft length of the calibrated CG range 101.

Once properly buttressed on the support leg 210, the airframe 102 is physically released such that the UAV 200 may freely pivot on the support leg 210. At this juncture, the UAV 200 may be designated as misbalanced if the aircraft pivots onto any one or more of the landing gears 110. In accord with the illustrated example of FIG. 3, each of the landing gears 110 shares a common (first or second) height 103 relative to a bottom most undercarriage surface of the airframe 102. Conversely, the support leg 210 has a distinct (third) height 105 relative to the airframe's 102 undercarriage; the support leg's 210 height 105 is greater than the landing gears' height 103. If the UAV 200 is overloaded in the forward direction (e.g., to the left in FIG. 3) such that the vehicle's actual CG is forward of the calibrated CG range 101, the UAV 200 will pitch forward (e.g., counterclockwise in FIG. 3) onto the front two landing gears (leftmost gear 110). To assist with determining if the UAV 200 has pivoted onto one of the landing gears 110 and is therefore misbalanced, a touch-sensitive load sensor 214 may be mounted onto each landing gear 110, located immediately adjacent the launch pad 113. Each load sensor 214 outputs one or more sensor signals to the CPU 118, remote control device 132, and/or a UAS ground control station (not shown) indicating that the corresponding landing gear 110 has contacted the subjacent support structure 113.

Additional and alternative system hardware may be employed to ascertain whether or not an aircraft's actual CG is outside of its calibrated acceptable CG range. By way of non-limiting example, FIG. 4 replaces (or supplements) the dedicated central landing gear 210 of FIG. 3 with a loading stanchion 310 that projects upwardly from a subjacent support structure 113. According to this representative system architecture, the fuselage 104 sits on top of the loading stanchion 310 such that the UAV 300 balances above the support platform 113. The loading stanchion 310 as shaped and sized to allow the UAV 300 to pitch fore and aft and, optionally, roll to starboard and port as a result of improper payload distribution. As a further option, the load sensors 214 of FIG. 3 may be replaced by (or supplemented with) pressure-sensitive sensor pads 314 that are mounted on a top surface of the support platform 113, located immediately adjacent the landing gears 110. In this instance, the system may ascertain whether or not the UAV 300 has pivoted onto one of the landing gears 110 based upon one or more sensors signals received from one or more of the sensor pads 314 indicating contact of a landing gear 110 with a pad 314.

If a UAV 200, 300 has pivoted onto any one of the landing gears 110 while concurrently supported on the support leg 210, 310—demonstrating the aircraft payload distribution is "unacceptable"—one or more payload units and/or hardware modules may be relocated to new positions on the airframe 110. The UAV's 200, 300 payload/hardware is rearranged in a manner that has been determined to shift the aircraft's actual CG to within the calibrated CG range and thereby balance the aircraft on the support leg 210, 310. The new payload/hardware arrangement may be retrieved, e.g., via CPU 118, remote control device 132, and/or a UAS ground control station, from a memory-stored lookup table that correlates known payload/hardware combinations with predetermined payload/hardware arrangements that are within acceptable CG range. Once rearranged, each payload unit/hardware module is operatively attached to the airframe 102 at its new airframe position. As used herein, the term "attach" and permutations thereof may be defined to include movably mounting, rigidly mounting, stowing on or within, and the like. In FIG. 4, the UAV 300 includes one or more electronic actuators 312 that is/are mounted to the airframe 102 and selectively operable to accurately reposition a payload unit/hardware module. In this instance, the aircraft CPU 118, remote control device 132, and/or ground control station may issue command signals to the electronic actuator (s) 312 to individually or jointly reposition each payload unit/hardware module relative to the airframe 102.

FIGS. 5A-5D illustrate a representative modular rail-and-carriage (rail) system 400 for provisioning weight distribution of an aircraft, such as for UAVs 100, 200 and 300 of FIGS. 1-4. This modular rail system 400 may be employed for attaching aircraft subsystems, such as battery, antenna, and electronics hardware modules (collectively represented at 402 in FIG. 5A), aircraft payloads, such as ISR payload units and cargo payload units (collectively represented at 404 in FIG. 5A), and other mechanical structures to the interior or exterior of an airframe. The modular rail system 400 may employ a single or a pair of mounting rails 410 that are located at discretized longitudinal rail positions. These mounting rails 410 may be substantially parallel to each other; however, the rails 410 are not functionally constrained by the gap distance between them. To minimize manufacturing costs and to simplify overall system design, the mounting rails 410 may be substantially identical to each other and may be manufactured from the same material (e.g., aluminum, steel, high-strength polymers, composited and fiber-reinforced polymers, etc.). It should be appreciated, however, that the modular rail system 400 of FIGS. 5A-5D may employ more than two mounting rails 410, which may be structurally distinct from one another and may be arranged in any suitable pattern.

The mounting rails 410 of modular rail system 400 is mounted to a load-bearing surface of an aircraft's airframe 102. One or more carriages 412 detachably affix to the mounting rails 410 and independently or cooperatively bear the payload unit and/or hardware module 402, 404, e.g., using one or more square-tube crossbars 414 and one or more square-tube joists 416. Each mounting rail 410 has a U-shaped transverse cross-section with an outboard (first) wall 411 that is parallel to and spaced from an inboard (second) wall 413. An integral base 415 extends between and connects the mutually parallel inboard and outboard walls 411, 413. The outboard walls 411 of the mounting rails 410 include a series of longitudinally spaced, L-shaped slots 417. Each slot 417 slidably receives therein a complementary "shoulder screw" slide pin 418 that projects transversely from one end of the carriage 412. Both walls 411, 413 of the mounting rail 410 include a series of longitudinally spaced, circular fastener through-holes 419. Pairs of the fastener through-holes 419 are aligned with each other to receive therethrough a complementary locking pin 420 that mechanically fasten the carriage 412 to the mounting rails 410.

Figure 6:
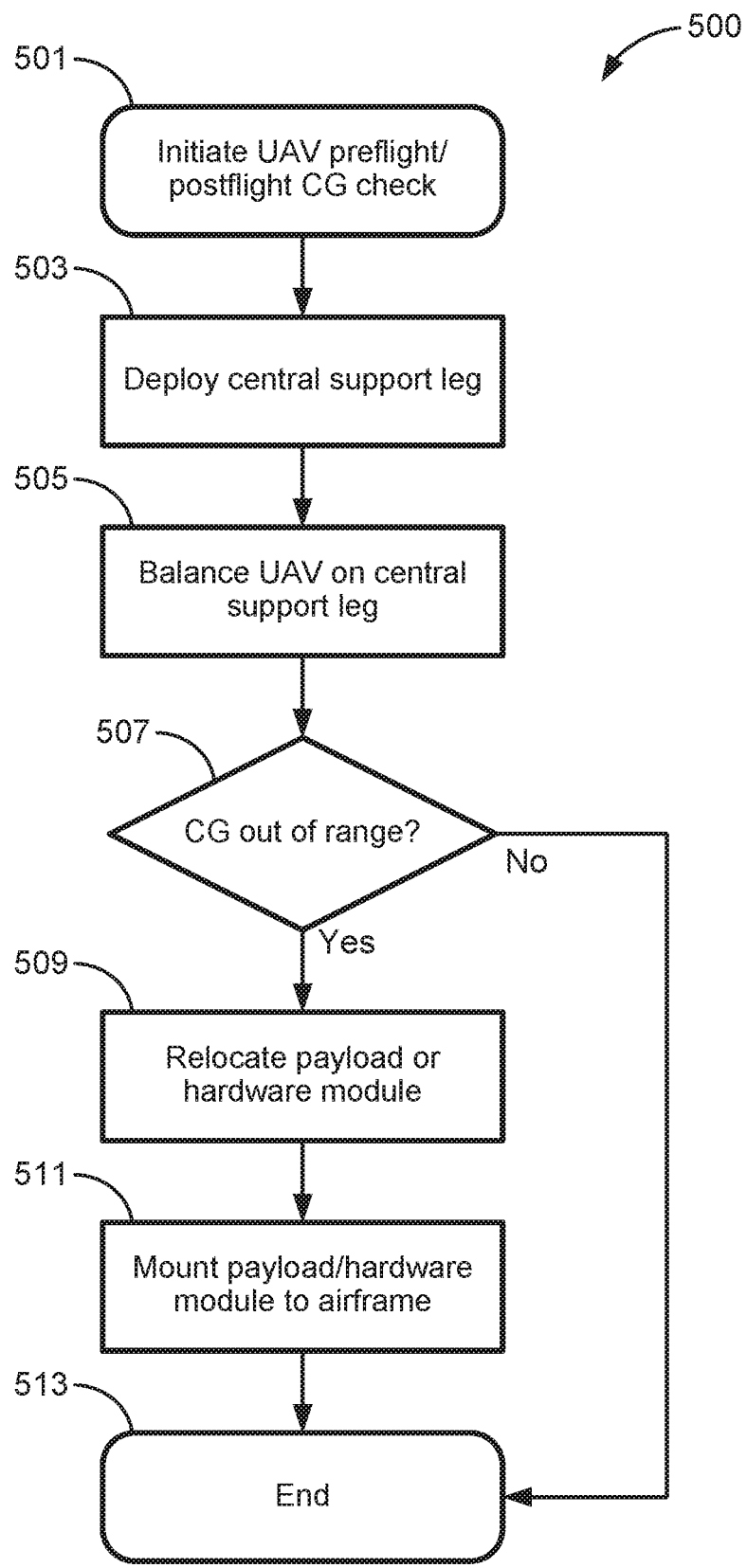
FIG. 6 is a flowchart illustrating a representative algorithm for provisioning airframe weight distribution for CG management of an aircraft, which may correspond to memory-stored instructions executed by control-logic circuitry, programmable electronic control unit, or other computer-based device or network of devices in accord with aspects of the disclosed concepts.

With reference now to the flow chart of FIG. 6, an improved method or control strategy for control of weight distribution on an airframe for management of an aircraft's CG is generally described at 500 in accordance with aspects of the present disclosure. Some or all of the operations illustrated in FIG. 6, and described in further detail below, may be representative of an algorithm that corresponds to processor-executable instructions that may be stored, for example, in main or auxiliary or remote memory, and executed, for example, by a resident or remote controller, central processing unit, control logic circuit, or other module or device or network of devices, to perform any or all of the above or below described functions associated with the disclosed concepts. It should be recognized that the order of execution of the illustrated operations may be changed, additional operations may be added, and some of the operations described may be modified, combined, or eliminated.

Method 500 begins at terminal block 501 with processor-executable instructions for a programmable controller or control module or similarly suitable processor to call up an initialization procedure for a preflight/postflight CG check protocol. This routine may be called-up and executed in real-time, continuously, systematically, sporadically, and/or at regular intervals, etc., during use of the UAVs 100, 200, 300 of FIGS. 1-4. At process block 503, a deploy command prompt is transmitted to deploy a central support leg from or into contact with the airframe of the aircraft. For system configurations in which the support leg is fixed, process block 503 may be omitted from method 500. Once deployed, a balance command prompt is output to balance the aircraft on the deployed support let, as indicated at process block 505.

While the aircraft is held up, in whole or in part, via the support leg, the method 500 advances to decision block 507 with processor-executable instructions to determine whether or not the aircraft's CG is outside a vehicle-calibrated "acceptable" CG range. If not (Block 507=NO), the method 500 may circle back to terminal block 501 and run in a continuous loop; alternatively, method 500 may proceed to terminal block 513 and temporarily terminate. An optional system code may be entered into memory, and a notification transmitted to an operator, indicating that the aircraft is deemed to be balanced. Upon determining that the aircraft CG is in fact outside its acceptable CG range (Block 507=YES), method 500 proceeds to process blocks 509 and 511 to carry out ameliorative actions in an attempt to correct or offset the misbalanced aircraft. Alternatively, one or more electronic notifications may be output to an operator warning them of the misbalanced aircraft and/or providing instructions for correcting the issue.

With continuing reference to FIG. 6, method 500 advances from decision block 507 to process block 509 with instructions to output a reposition command prompt to relocate one or more payloads and/or one or more hardware modules in a manner that has been established will correct the aircraft's presently out-of-range CG. Once properly rearranged, method 500 outputs a mount command prompt to reattach the repositioning payload(s) and/or hardware module(s), as indicated at process block 511. Payload/hardware positioning and attachment may be manual or automated or a combination of the two. An optional secondary CG check may be conducted at this time to ensure that the aircraft has now been properly balanced. Method 500 thereafter advances to terminal block 513. For at least some implementations, active repositioning of airframe ballast to adjust the aircraft's CG may also be done via an open loop control system, i.e. without active sensing. For example, if a delivery drone is configured to deliver a certain payload of known mass, a requisite CG shift after delivery can be precalculated. Doing so helps to avoid the complexity of active vehicle sensing, e.g., replacing it by a priori payload characterization.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid state memory, a CD-ROM, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for managing a center of gravity (CG) of an aircraft, the aircraft including a first landing gear, a second landing gear, and an airframe, the airframe configured to removably attach thereto a payload and/or a hardware module, the method comprising:
   supporting the aircraft on a support structure via a support leg operatively attached to the airframe such that both the first and second landing gears are displaced away from the support structure;
   determining if the aircraft, while supported on the support structure via the support leg, pivots onto the first landing gear or the second landing gear;
   identifying, responsive to the aircraft pivoting onto the first landing gear or the second landing gear, a new airframe position for the payload and/or the hardware module, the new airframe position being determined to shift the CG of the aircraft to within a calibrated CG range and thereby balance the aircraft on the support leg; and
   relocating the payload and/or the hardware module to the airframe at the new airframe position.

2. The method of claim 1, wherein the support leg is movably mounted at a first end thereof to the airframe and located between the first landing gear and the second landing gear, the method further comprising moving the support leg into contact with the support structure.

3. The method of claim 2, wherein the support structure is subjacent the aircraft, and wherein the support leg includes a landing skid mounted to a second end of the support leg, opposite the first end, the landing skid buttressing the aircraft on the support structure.

4. The method of claim 3, wherein the calibrated CG range has a fore-aft range length relative to the airframe of the aircraft, and wherein the landing skid has a fore-aft skid length substantially coextensive with the fore-aft range length of the calibrated CG range.

5. The method of claim 1, wherein the first landing gear has a first height, the second landing gear has a second height, and the support leg has a third height greater than the first height and the second height of the first and second landing gears, respectively.

6. The method of claim 5, wherein the support structure is subjacent the aircraft, the first landing gear includes a first load sensor, and the second landing gear includes a second load sensor, and wherein determining if the aircraft pivots onto the first landing gear or the second landing gear includes receiving, via a controller from the first load sensor or the second load sensor, a sensor signal indicating contact of the first landing gear or the second landing gear, respectively, with the support structure.

7. The method of claim 1, wherein the support leg includes a loading stanchion projecting upward from the support structure subjacent the aircraft, and wherein supporting the aircraft on the support leg includes balancing the aircraft on the loading stanchion.

8. The method of claim 7, wherein the support structure includes a first sensor pad adjacent the first landing gear and a second sensor pad adjacent the second landing gear, and wherein determining if the aircraft pivots onto the first landing gear or the second landing gear includes receiving, via a controller from the first sensor pad or the second sensor pad, a sensor signal indicating contact thereof with the first landing gear or the second landing gear, respectively.

9. The method of claim 1, wherein the aircraft includes an electronic actuator mounted to the airframe and operable to relocate the payload and/or the hardware module, and wherein relocating the payload and/or the hardware module to the new airframe position includes transmitting, via a controller to the electronic actuator, a command signal to relocate the payload and/or the hardware module relative to the airframe.

10. The method of claim 1, wherein relocating the payload and/or the hardware module to the airframe includes rigidly mounting the payload and/or the hardware module to the airframe.

11. The method of claim 10, wherein the aircraft includes a mounting rail affixed the airframe, the mounting rail configured to removably mount thereto a carriage bearing the payload and/or the hardware module.

12. The method of claim 11, wherein the mounting rail includes an L-shaped slot configured to receive therein a complementary slide pin projecting from the carriage, and a fastener through-hole configured to receive therethrough a complementary locking pin fastening the carriage to the rail.

13. An aircraft comprising:
   an airframe configured to removably attach thereto a payload and/or a hardware module;
   first and second landing gears projecting from the airframe and cooperatively configured to buttress the aircraft during takeoff and landing operations;
   a support leg configured to operatively attach to the airframe, between the first and second landing gears, and support the aircraft on a support structure such that both the first and second landing gears are elevated above the support structure; and
   a controller programmed to:
      determine if the aircraft, while supported on the support structure via the support leg, pivots onto and presses the first landing gear or the second landing gear into contact with the support structure;
      responsive to the aircraft pivoting onto and pressing the first landing gear or the second landing gear into contact with the support structure, identify a new airframe position for the payload and/or the hardware module determined to shift the center of gravity (CG) of the aircraft to within a calibrated CG range and thereby balance the aircraft on the support leg; and
      output a command prompt to relocate the payload and/or the hardware module to the new airframe position.

14. A control system for managing a center of gravity (CG) of an aircraft, the aircraft including a first landing gear, a second landing gear, and an airframe, the airframe configured to removably attach thereto a payload and/or a hardware module, the control system comprising:
   a support leg configured to operatively attach to the airframe, between the first landing gear and the second landing gear, and support the aircraft on a support structure such that both the first and second landing gears are displaced away from the support structure;
   first and second sensor devices configured to detect loading of the aircraft onto the first landing gear and the second landing gear, respectively; and
   a controller programmed to:

determine, based on a sensor signal received from the first sensor device or the second sensor device, if the aircraft pivoted onto the first landing gear or the second landing gear, respectively, while supported on the support structure via the support leg;

responsive to the aircraft pivoting onto the first landing gear or the second landing gear, determine a new airframe position for the payload and/or the hardware module, the new airframe position determined to shift the center of gravity (CG) of the aircraft to within a calibrated CG range and thereby balance the aircraft on the support leg; and output a command prompt to relocate the payload and/or the hardware module to the new airframe position.

15. The control system of claim 14, wherein the support leg is movably mounted at a first end thereof to the airframe and located between the first landing gear and the second landing gear, the controller being further programmed to output a second command prompt to move the support leg into contact with the support structure.

16. The control system of claim 15, wherein the support structure is subjacent the aircraft, and wherein the support leg includes a landing skid mounted to a second end of the support leg, opposite the first end, the landing skid buttressing the aircraft on the support structure.

17. The control system of claim 14, wherein the first sensor device includes a first load sensor mounted to the first landing gear, and the second sensor device includes a second load sensor mounted to the second landing gear.

18. The control system of claim 14, wherein the support leg includes a loading stanchion projecting upward from the support structure subjacent the aircraft, and wherein supporting the aircraft on the support leg includes balancing the aircraft on the loading stanchion.

19. The control system of claim 14, wherein the first sensor device includes a first sensor pad mounted to the support structure adjacent the first landing gear, and the second sensor device includes a second sensor pad mounted to the support structure adjacent the second landing gear.

20. The control system of claim 14, further comprising an electronic actuator mounted to the airframe and operable to reposition the payload and/or the hardware module in response to the command prompt output via the controller.

\* \* \* \* \*